(12) United States Patent
Schumacher (10) Patent No.: US 8,165,862 B2
(45) Date of Patent: Apr. 24, 2012

(54) METHODS AND SYSTEMS FOR PREDICTING APPLICATION PERFORMANCE

(75) Inventor: Hans Josef Schumacher, Kent, WA (US)

(73) Assignee: The Boeing Company, Chicago, IL (US)

( * ) Notice: Subject to any disclaimer, the term of this patent is extended or adjusted under 35 U.S.C. 154(b) by 882 days.

(21) Appl. No.: 12/025,934

(22) Filed: Feb. 5, 2008

(65) Prior Publication Data

US 2009/0198482 A1    Aug. 6, 2009

(51) Int. Cl.
G06F 17/50   (2006.01)
G06F 9/45    (2006.01)

(52) U.S. Cl. .......................... 703/13; 703/22

(58) Field of Classification Search ............. 703/13, 703/19, 22, 23; 709/223, 224, 226
See application file for complete search history.

(56) References Cited

U.S. PATENT DOCUMENTS

| | | | |
|---|---|---|---|
| 5,809,282 A * | 9/1998 | Cooper et al. | 709/226 |
| 6,745,010 B2 | 6/2004 | Wright et al. | |
| 6,775,545 B2 | 8/2004 | Wright et al. | |
| 7,188,172 B2 | 3/2007 | del Val et al. | |
| 2004/0143428 A1* | 7/2004 | Rappaport et al. | 703/22 |
| 2006/0176824 A1 | 8/2006 | Laver et al. | |
| 2007/0112479 A1 | 5/2007 | Wright et al. | |
| 2007/0112486 A1 | 5/2007 | Avery et al. | |
| 2007/0112489 A1 | 5/2007 | Avery et al. | |
| 2007/0112576 A1 | 5/2007 | Avery et al. | |
| 2007/0112608 A1 | 5/2007 | Avery et al. | |
| 2007/0124222 A1 | 5/2007 | Avery et al. | |
| 2007/0124223 A1 | 5/2007 | Avery et al. | |

* cited by examiner

*Primary Examiner* — Paul Rodriguez
*Assistant Examiner* — Luke Osborne
(74) *Attorney, Agent, or Firm* — Armstrong Teasdale LLP (57) ABSTRACT

A method for identifying and evaluating potential computer network configuration problems as related to deployment of one or more computer applications accessed via an associated computer network architecture is described. The method includes emulating the computer network architecture and a capability associated with network interconnections between computer application points of use and associated with the computer network architecture, identifying computer applications hosted at each of the computer systems within the computer architecture, estimating response times for hosted computer applications for a plurality of network architecture interconnection conditions, and determining, based on the response time estimates, at least one network architecture reconfiguration scenario for improving performance of the network architecture with respect to a specific computer application.

18 Claims, 8 Drawing Sheets

METHODS AND SYSTEMS FOR PREDICTING APPLICATION PERFORMANCE

BACKGROUND OF THE INVENTION

This invention relates generally to performance limitations that applications encounter when accessed over a network connection, and more specifically, to methods and systems for predicting application performance by developing an understanding of the performance limitations that applications encounter regarding, for example, bandwidth, latency, packet loss and connection utilization, coupled with a number of users accessing the application.

When an understanding of performance limitations for one or more applications has been developed, it enable a sales force, product managers, architects and developers associated with a particular application to understand the performance boundaries of the application. Such an understanding is important when developing target campaigns for customers who can effectively use the application. In addition, the understanding of performance limitations allows those associated with the application to implement changes to expand the performance boundaries.

Further, an understanding of performance limitations enables companies to effectively estimate connectivity requirements (both LAN and Internet) for acceptable system response time, and to determine how effectively systems will perform based on existing network conditions that include the aforementioned bandwidth, latency, packet loss, utilization, and number of users.

Currently, an understanding of performance limitations in regard to a specific system or network configuration is accomplished through individualized custom testing of the application in a single company-specific scenario. The disadvantages of such testing include the high cost and excessive amount of time and resources to do individual testing for all potential scenarios. Finally, for purveyors of such applications, an inability of third parties to perform their own analysis and decision making result in additional disadvantages.

BRIEF DESCRIPTION OF THE INVENTION

In one aspect, a method for identifying and evaluating potential computer network configuration problems as related to deployment of one or more computer applications accessed via an associated computer network architecture is provided. The method includes emulating the computer network architecture and a capability associated with network interconnections between computer application points of use (i.e. different worker locations) and associated with the computer network architecture, identifying computer applications hosted at each of the computer systems within the computer architecture, estimating response times for hosted computer applications for a plurality of network architecture interconnection conditions, and determining, based on the response time estimates, at least one network architecture reconfiguration scenario for improving performance of the network architecture with respect to a specific computer application.

In another aspect, a computer system for evaluating and designing network architectures suitable for a suite of network applications is provided. The computer system includes a user interface operable to create representations of custom network architectures, a processing device, operable to receive data relating to the representations created via the user interface, and further programmed to provide application performance profiles based on the custom network architecture representations, and a database configured store the application performance profiles.

In still another aspect, a method is provided for evaluating the response time of a network application. The method includes testing the response time of an application under multiple network configuration permutations, storing results of each test in a database, and using the stored results to predict end-user response times for the network application for each network configuration permutation.

DETAILED DESCRIPTION OF THE INVENTION

The embodiments described herein enable system users to design complex network architectures, identify systems (computer applications) used at various locations, and estimate system response times for any number of users located at those locations and traversing various network conditions. A technical effect of such embodiments is an ability to accurately estimate performance of a computer network architecture with respect to the running of specific applications, for example, across a network. With these estimates, application providers can advise clients of changes that might be implemented within their systems and networks that will provide, for example, the largest improvements in system performance when a particular application is added for a number of system users.

Figure 1:
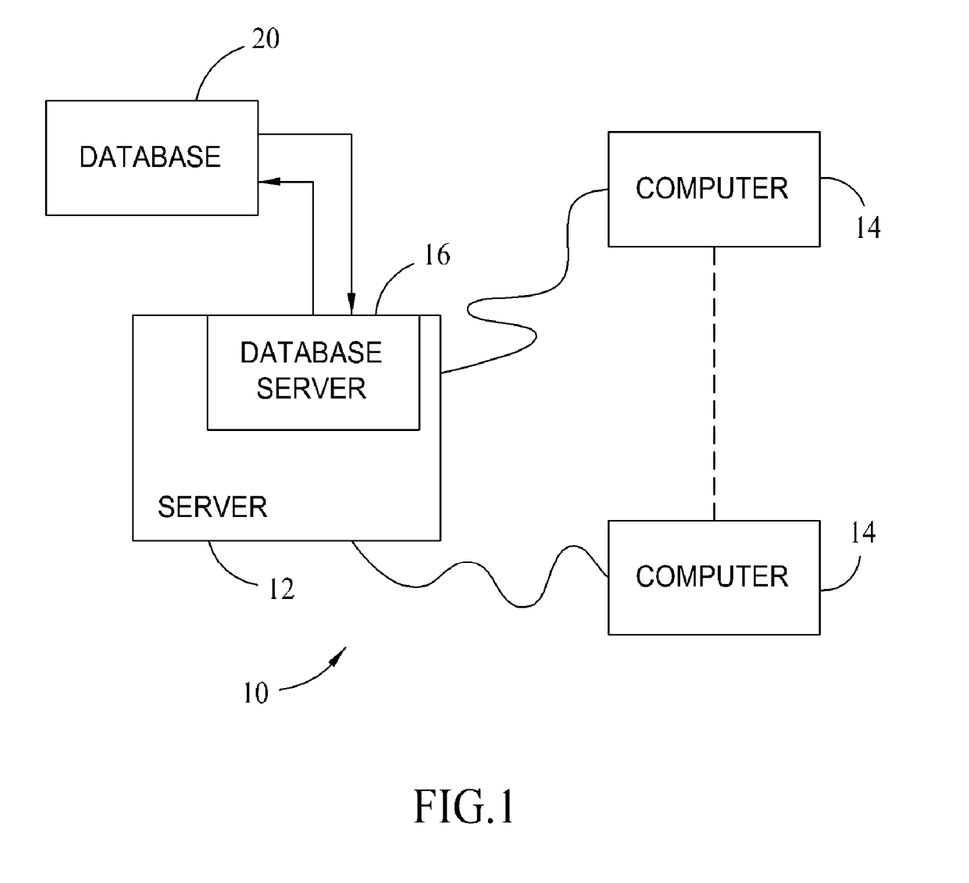
FIG. 1 is a simplified block diagram of an exemplary embodiment of a server architecture of a system in accordance with one embodiment of the present invention.

FIG. 1 is a simplified block diagram of an exemplary system 10 in accordance with one embodiment of the present invention. In one embodiment, system 10 is a computer system that includes a processing device used for determining, response times for various computer network architectures as further described herein. As further described computer system 10 incorporates a user interface through which an ability is provided to design and emulate a large number of complex network architectures, including such architectures that include many office (computer system) locations. Through the user interface, a connection between each office location can be designed and emulated. In another embodiment, system 10 is programmed with a user interface through which a user can specify network conditions within specific computer network architectures in order to determine response times within the architectures.

More specifically, in the example embodiment, system 10 includes a server system 12, and a plurality of client subsystems, also referred to as client systems 14, connected to server system 12. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
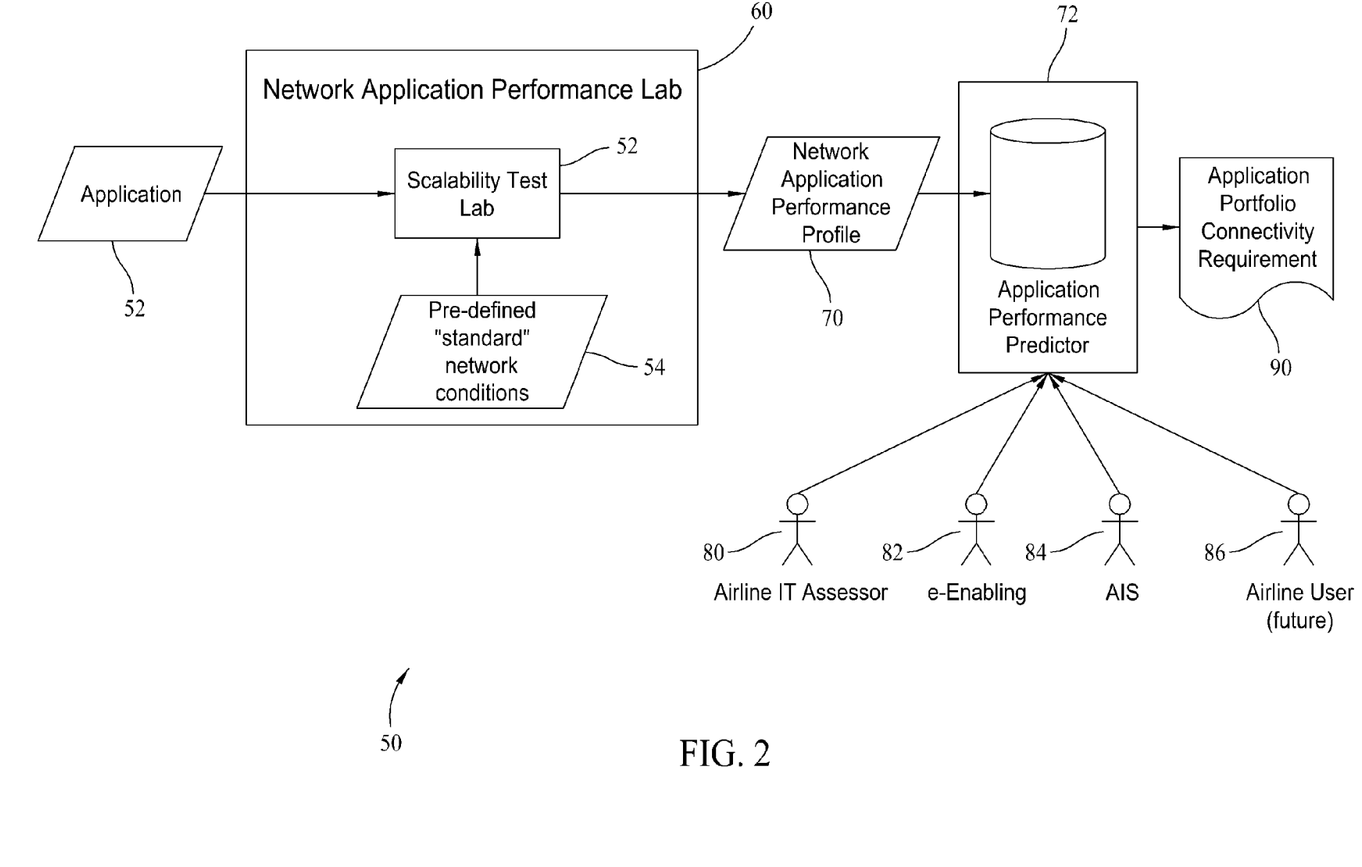
FIG. 2 is a context diagram depicting a process for testing a network application under a variety of network conditions.

FIG. 2 is a context diagram 50 depicting a process for testing a network application 52 under a variety of network conditions. The testing is done in an environment called a network application performance lab 60 that includes a scalability test lab 62 which utilizes a library 64 of predefined standard network conditions. The network application performance lab 60 is utilized to create a network application performance profile 70 that indicate a response time associated with the application (i.e. system performance) for the variety of network conditions in the library 54.

The performance profile 70 data is loaded into an application performance predictor 72 which is then used by a number of individual system users 80, 82, 84, and 86, for example. Through use of the application performance predictor 72 by the various users, an application portfolio connectivity requirement 90 is generated which is an assessment, for utilization by a system administrator for example, of what changes can be implemented in the system, and what benefit those changes will bring, with respect to application performance for a particular application running on that system.

In one embodiment, the generation of the network application performance profile 70 and the application performance predictor 72 provides an ability to design a large number of complex network architectures using drag and drop functionality, including such architectures that include many office locations and a connectivity between each office location. In addition, a user is provided with an ability to specify unique systems used at each office location and a number of users using the system at each office location.

The application portfolio connectivity requirement 90 includes a computation of the estimated response time of the system for each location, taking into account all of the other systems whose traffic is routed (passes) through the same network connection. Additionally, a variable analysis, demonstrating the effect on response time of increasing or decreasing one of the four variables of bandwidth, packet loss, latency and line utilization is provided by the application portfolio connectivity requirement 90.

Proper utilization of the network application performance profile 70 and the application performance predictor 72 provides a flexible tool that provides performance (response time) estimates for nearly any number of situations with nearly any number of systems routing through nearly any number of network connections. This functionality is accomplished by running a system through a single set of network condition tests, rather than running a specific network condition test for each scenario for which performance estimates are required.

There are three main components that provide the functionality described with respect to context diagram 50, these include a database that stores the results of application performance profiling, a user interface as further described below, and the algorithms and business logic utilized to provide the application portfolio connectivity requirement. Before a network system's performance can be calculated, it is run through a battery of tests. In one embodiment, a particular system transaction is defined and tested in a wide variety of network condition permutations, for example, a range of bandwidth, latencies, packet losses and line utilization values. The resulting response time in each of these permutations is stored in the database.

Figure 3:
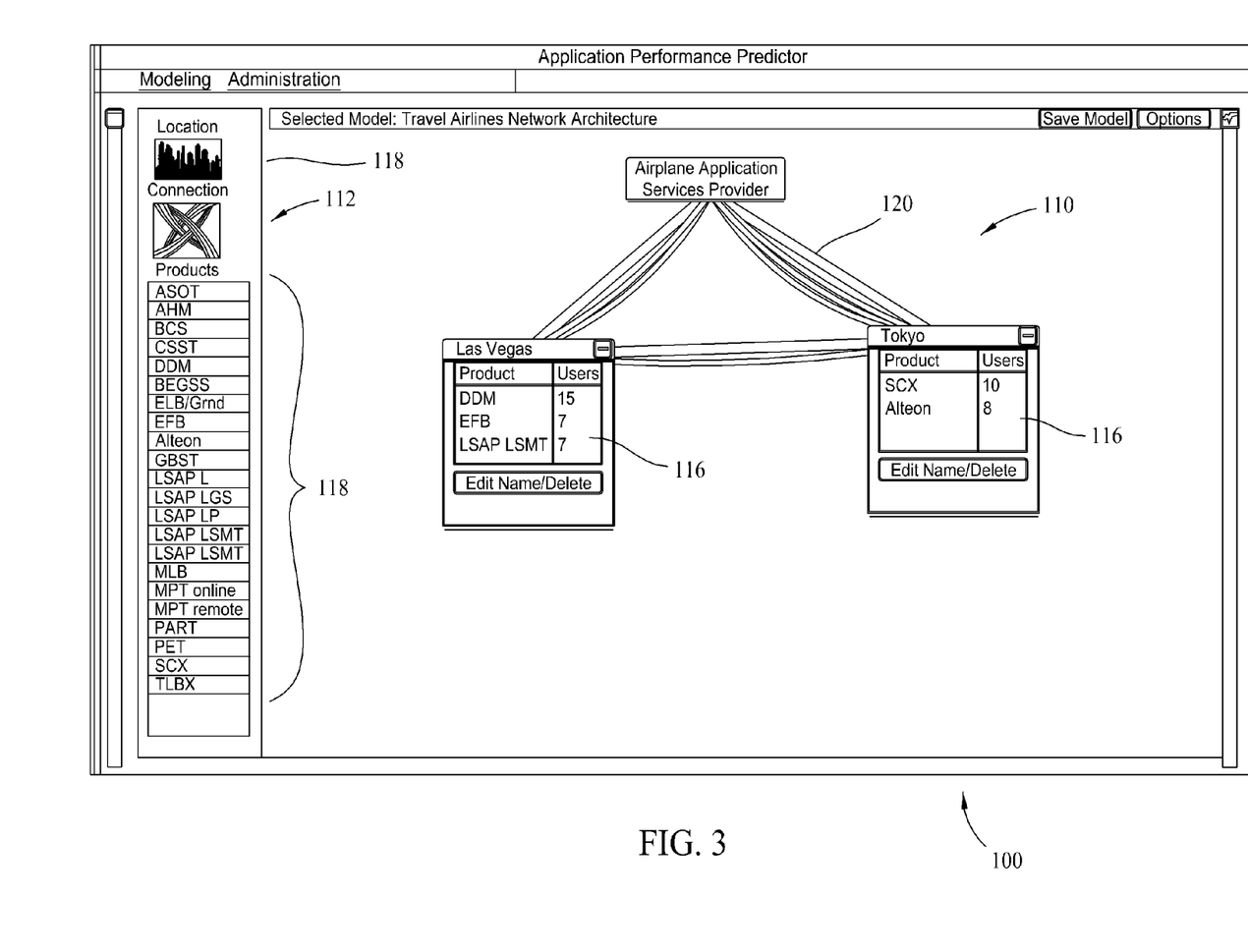
FIG. 3 is one embodiment of a user interface that enables users to create representations of custom network architectures.

FIG. 3 is one embodiment of a user interface 100 that enables users to create representations of custom network architectures 110, specify network conditions 112 for wide area network and internet connections, specify systems 114 used at each location, the number of users 116 of a system at each location 118 and the routing (connections 120) of system traffic. Based on the data available from the user interface a user is able to generate and view performance reports.

As will be understood from the following descriptions, the algorithms process all of the various office locations 118, the connections 120 between offices locations 118, and the internet and their associated network conditions (bandwidth, latency, packet loss, and utilization), the systems 114 used at each office location 118 and the number of users 116, and computes the expected response time of each system at each location through the running of variable analyses.

Users of user interface 100 and the computer systems that support user interface 100 include administrators, modelers, and viewers. An administrator is typically an employee user of an entity that provides the application performance prediction services described herein. More specifically, administrators have the ability to create, delete and read, for example, all company information while also providing access to the described user interfaces to other administrators, modelers and viewers. In one specific application, a modeler has access to create, delete and read all the companies they have been given access to either from the administrator or by another modeler, or companies/models that they have created themselves. Also referring to the specific application, a viewer is configured to have read access only for the companies to which they have been given access by an administrator or a modeler.

Figure 4A:
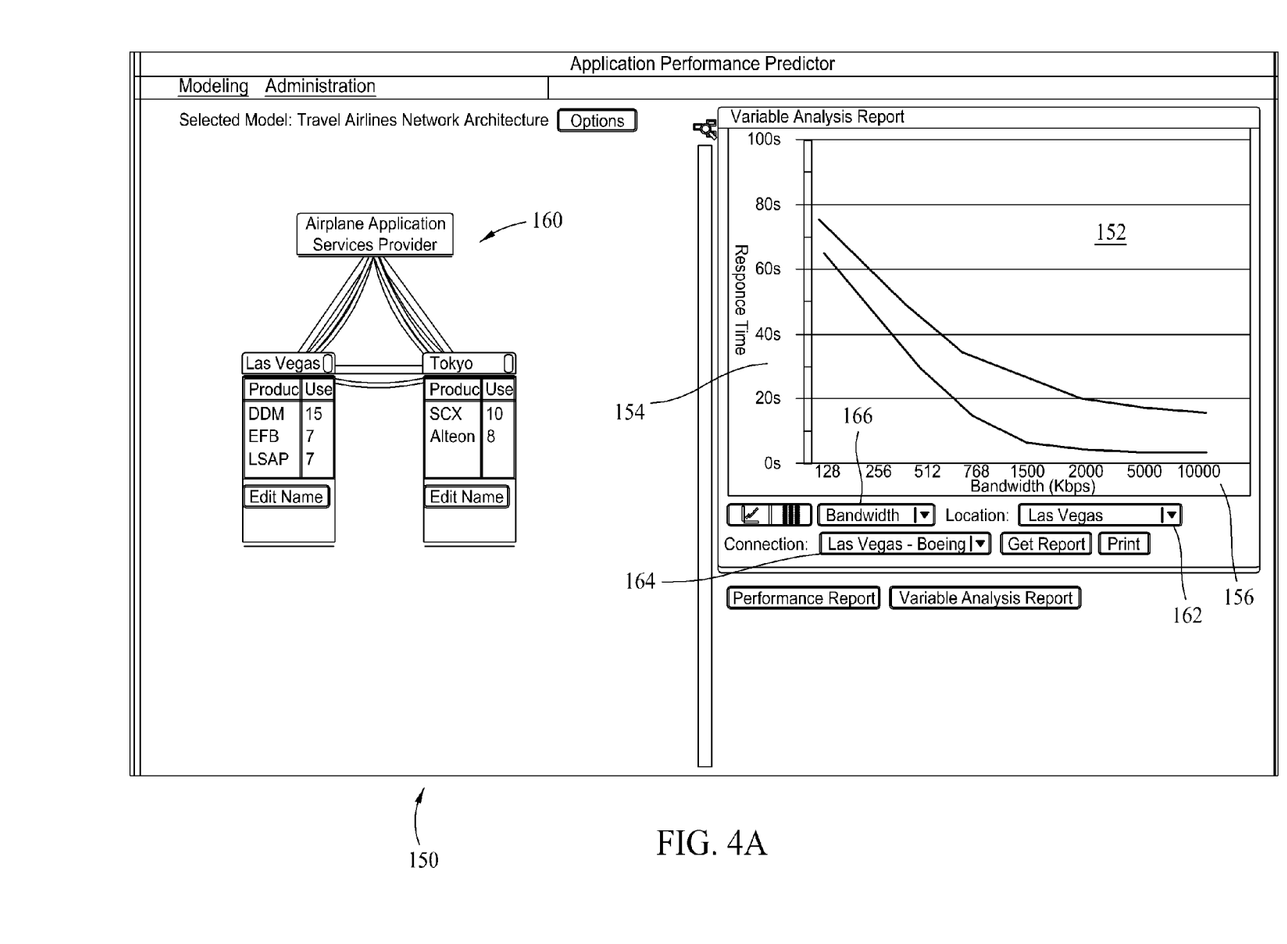
FIG. 4A is a screen mock-up of a variable analysis capability and a variable analysis report.
Figure 4B:
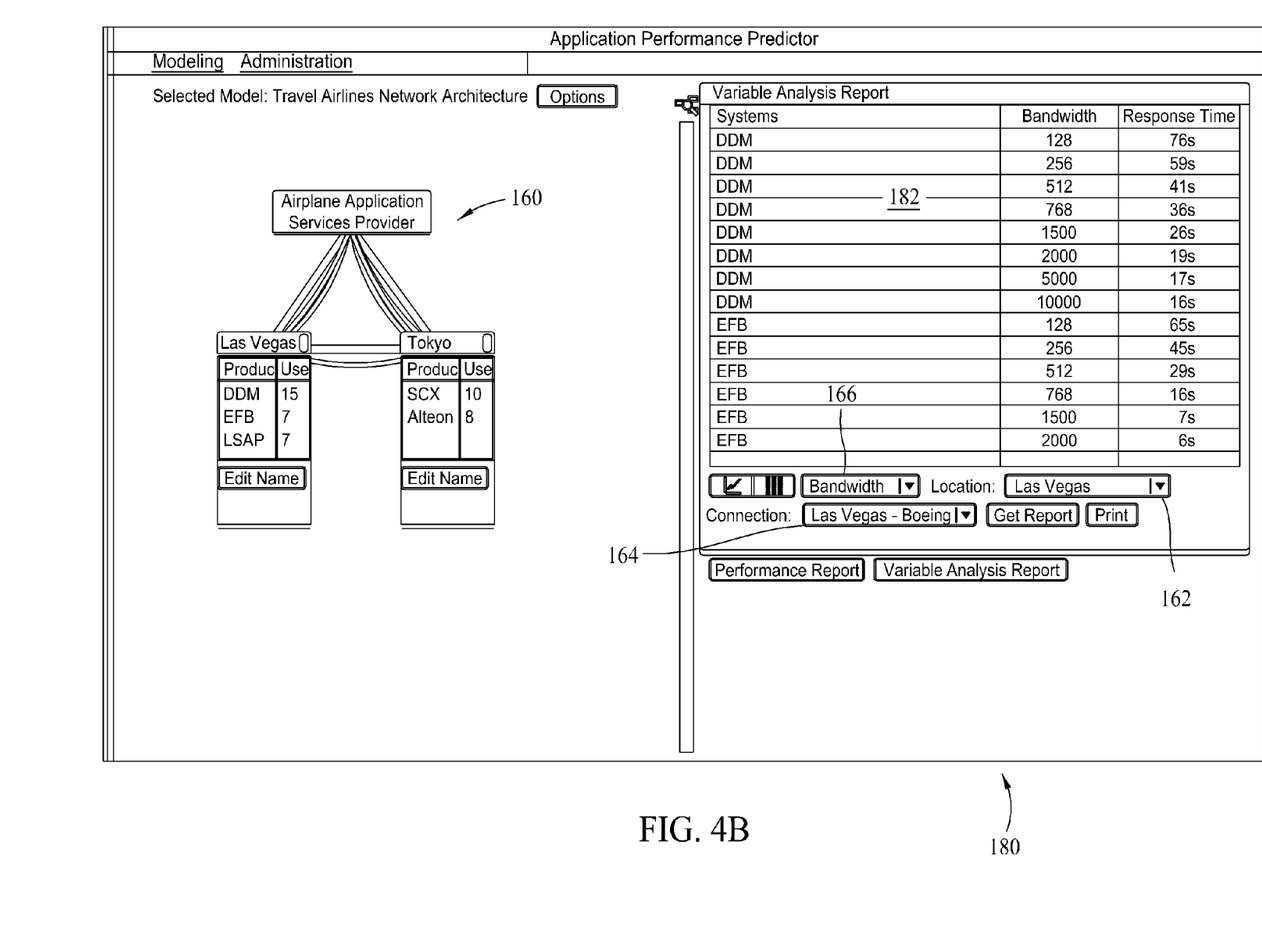
FIG. 4B is a screen mock-up that provides a matrix view of the variable analysis report of FIG. 4A.

FIG. 4A is a screen mock-up 150 of a variable analysis capability and a variable analysis report 152 that illustrates improvement in application response time 154 with respect to various bandwidth values 156. The calculation is based on an architecture 160 as entered by a user, a user selected location 162 for which the calculation is desired, a connection 164 that is being analyzed, and the condition 166 (e.g., bandwidth) that is being analyzed. FIG. 4B is a screen mockup 180 that provides a matrix view of the variable analysis report 182 of FIG. 4A.

Figure 5:
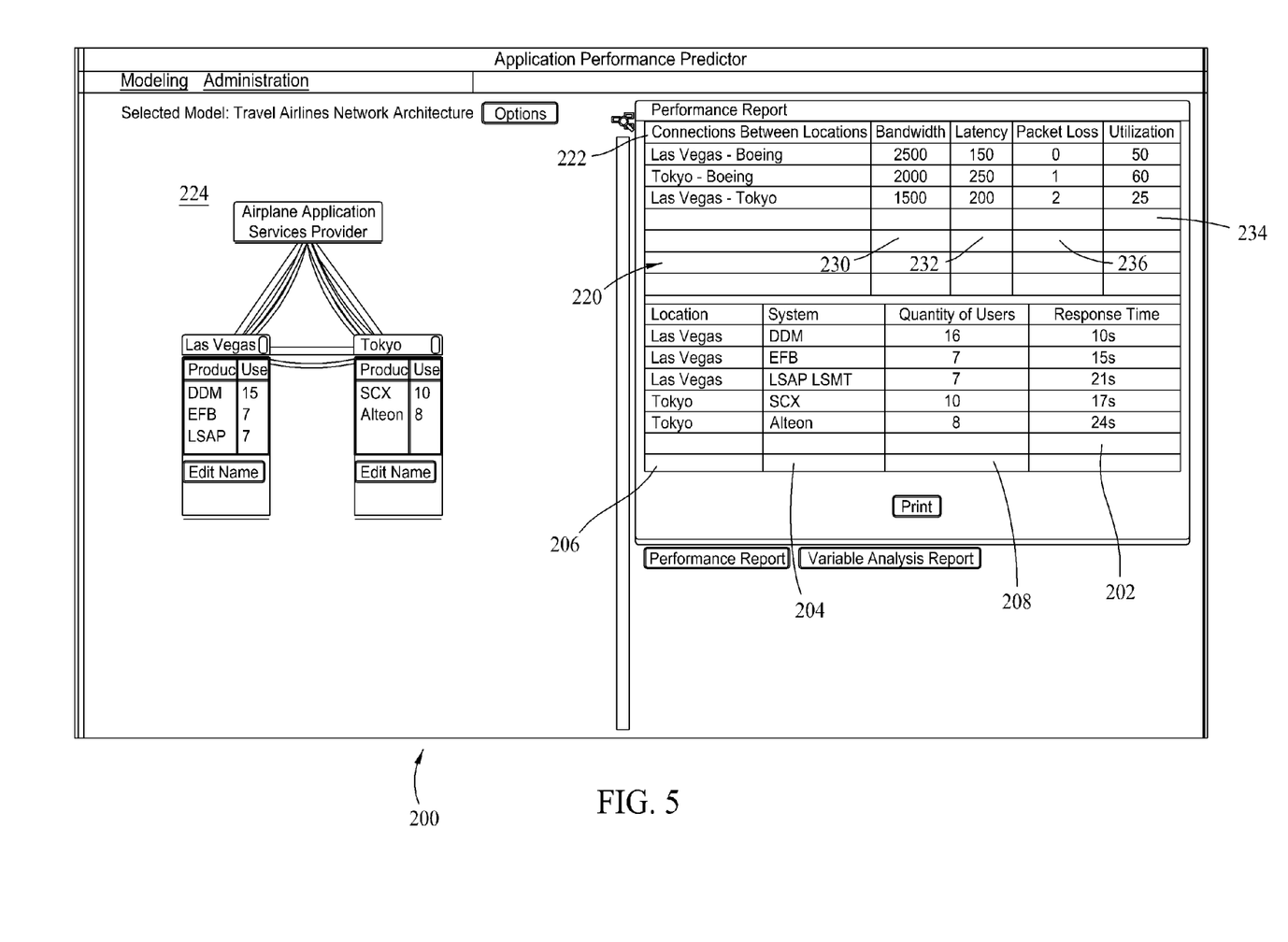
FIG. 5 is a screen mock-up that includes a response time report for multiple system applications, at multiple locations, with multiple users.

FIG. 5 is a screen mock-up 200 that includes a response time report 202 for multiple system applications 204 at multiple locations 206 with multiple users 208. Also included in screen mock-up 200 is a report 220 tabulating the various connections 222 associated with the architecture 224 being analyzed. Report 220 includes, for each individual connection, a bandwidth 230, a latency 232, a utilization percentage 234, and a packet loss percentage 236.

Figure 6:
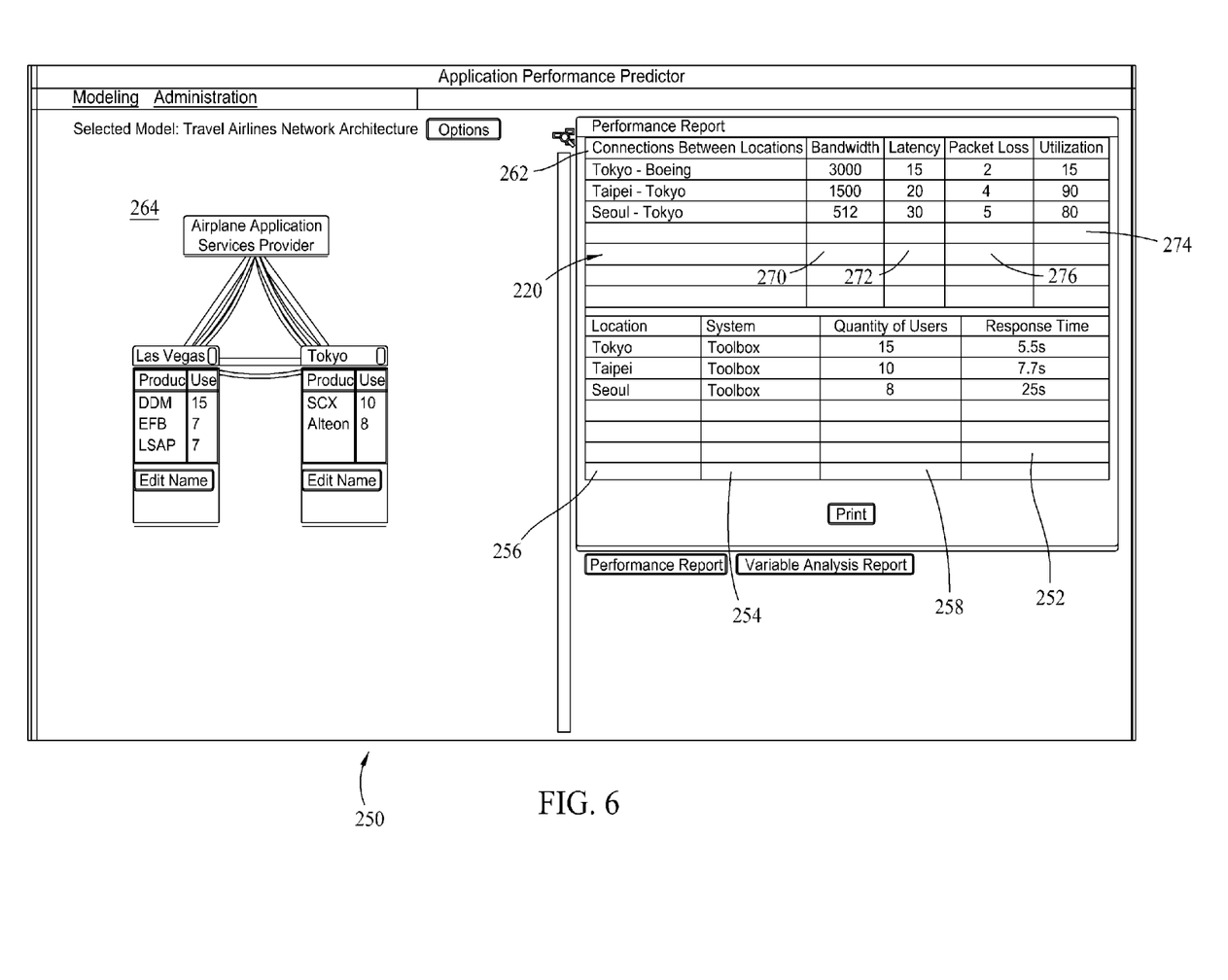
FIG. 6 is a screen mock-up of a response time report for a single system, at multiple locations, with multiple users.

FIG. 6 is a screen mock-up 250 of a response time report for a single system 254 at multiple locations 256 with multiple users 258. Also included in screen mock-up 250 is a report 260 tabulating the various connections 262 associated with the architecture 264 being analyzed. Report 260 includes, for each individual connection, a bandwidth 270, a latency 272, a utilization percentage 274, and a packet loss percentage 276 for the single system application being analyzed with respect to the architecture 264.

The following figures illustrate the above described embodiments in the context of applications that relate to the operation of airlines. In one business scenario, a provider of aircraft to airlines is also typically a supplier of services to airlines, such as computer applications that are intended to improve efficiency of airline operations, or that provide other services. However providing these types of applications presents a number of related challenges. One example that is relevant to the embodiments described herein is a determination of an airline's computer network capability to effectively host one of these computer applications. The embodiments in one aspect are utilized to illustrate, for potential purchasers and users of such computer applications, a capability of the users' network, and to develop suggestions as to options that can be considered by a potential customer/user. By way of vocabulary, airline metadata refers to basic, identifiable information, for example, an airline name, Central Customer Information Database identifier (CCID), and comments regarding the airline.

Figure 7:
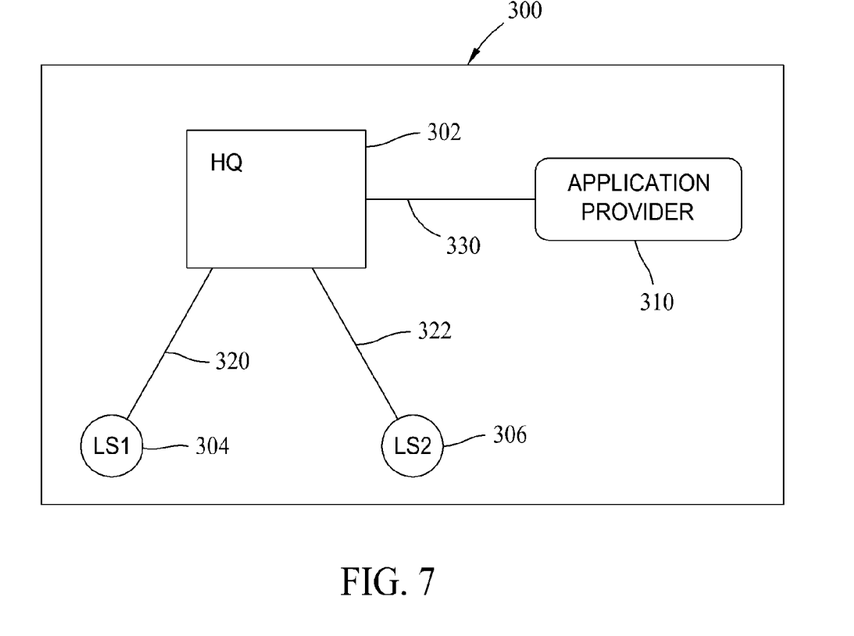
FIG. 7 is a diagram of a network architecture that represents all of the locations and connections within a particular airline network.

FIG. 7 is a diagram of a network architecture 300 that represents all of the locations (headquarters 302, line station one 304, and line station two 306) within a particular airline network in which e-enabled systems, or other provided computer applications, are run. This also shows locations of a computer application provider 310. Network architecture 300 also illustrates the various connections 320 and 322 between the airline locations and a connection 330 with the computer application provider.

Figure 8:
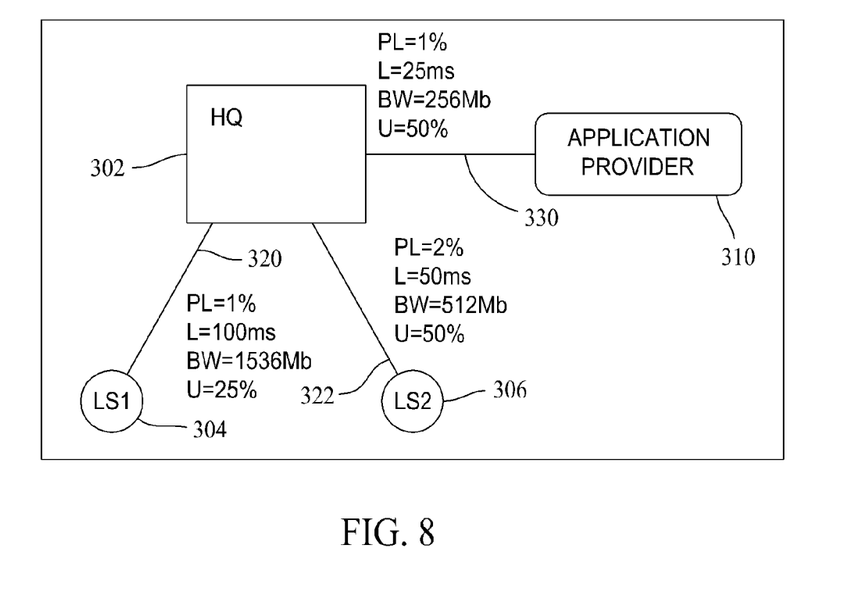
FIG. 8 is an illustration of the network architecture of FIG. 7, including network conditions for the architecture.

In FIG. 8, network conditions for the architecture 300 are shown for each connection in which communication occurs. The illustrated network conditions include packet loss (PL), latency (L), bandwidth (BW) and utilization (U). These conditions are either entered by a user of user interface 100, as described above, or are calculated for each of the connections. Summarizing FIG. 8, connection 320 has a PL of one percent, a L of 100 milliseconds, a bandwidth of 1536 kilobits per second, and a utilization of 25%. Connection 322 has a PL of two percent, a L of 50 milliseconds, a bandwidth of 512 kilobits per second, and a utilization of 50%. Finally, connection 330 has a PL of one percent, a L of 25 milliseconds, a bandwidth of 256 kilobits per second, and a utilization of 50%.

As utilized herein, a model refers to network architecture in its entirety and include the network conditions associated with the connections within the network. Now in regard to an administrator, who is typically associated with an application provider, such a person utilizes the application performance predictor tool to assess how an airline can reduce the response time they have for running an application or if the airline's current connectivity (network architecture) will provide satisfactory performance for a provided application. A computer application sales person, or a product manager, utilizes the application performance prediction tool to illustrate to a potential customer how the systems (added or upgraded computer applications) will run under their current network conditions and architecture. Finally, airline personnel utilize the application performance prediction tool to see if improvements should be made to their architecture, or if network conditions can be upgraded such that a response time, for example, can be decreased. The tool also illustrates what improvements could or should be made. The tool is further operable to determine which line station, for example, a computer application should be run from in order to maximize (i.e. reduce) response times for that application.

The following paragraphs provide several illustrative examples where a user utilizes the described application performance predictor. For example, a user works for an aircraft manufacturer and sells computer services to airlines. He has a list of services that he wants to sell to the airline, but knows that they do not have any money in their budget to change their infrastructure (network architecture). The user's support staff has done some testing of the airline's architecture from their line stations. Specifically, the support staff has tested each separate line station and collected the number of users, latency, packet loss and bandwidth. The user enters this information into the application performance predictor system and it indicates that, in addition to the systems (the computer application) that the airline is currently running, their current infrastructure will also satisfactorily run a toolbox application and an airplane health management tool, which are the computer application the user wishes to sell to the airline. Since the airline's network architecture is sufficient without any modifications, the user can attempt to sell the airline on the toolbox application and the airplane health management products.

In another scenario, an airline user is working at the headquarters of the airline and is experiencing a very slow response time using a computer application that is referred to as a cabin service system tool (CSST). He wants to decrease the response time of this system, but is not sure how to accomplish this goal. Therefore the airline user sends network specifications to the provider of the CSST, where the provider user enters the headquarters network specifications including variables for a number of users, latency, packet loss, bandwidth and current response time into the application performance predictor system. The provider user is able to adjust each variable separately to account for different services that the airliner could purchase to see which has the greatest effect on decreasing the response time of the CSST, which is then reported back to the airline user. The airline user is then able to determine that an upgraded quality of service appears to improve network performance significantly, and the airline user sets about acquiring the upgraded quality of service.

In another example, an airline user wishes to utilize an electronic flight bag (EFB) application for their fleet of aircraft. Specifically, they want to run the EFB application through an off site line station and want to know if having the application hosted at the off site station will provide sufficient response time. They contact a representative of the company that supplies the EFB application and give the representative specifications for the line station. The EFB application supplier enters the line station information into the application performance predictor tool and determines the response time of the EFB application from the off site station, which is provided to the airline user. The EFB application provider also instructs the airline if the determined response time is acceptable for the EFB application.

A user works for an aircraft provider that also provides airline operation applications and has received several complaints, from several airlines, about a My Fleet (MF) computer application. The user wants to determine what is causing the slow response time among the different airlines. The user utilizes the application performance predictor to find which attribute (PL, L, BW, U) makes the biggest difference on the response time for the MF computer application. After seeing that latency has the greatest impact, the user reports this information back to the MF application team, and asks what can be done to the application to reduce its dependency on low latency connectivity.

A user is conducting an information technology assessment for an airline. He goes to the headquarters and several line stations and gathers the applications, number of users for each application, company network architecture and network conditions for the architecture. This information is input into the application performance prediction tool to determine what architecture improvements should be done to improve the response time of the various systems within the architecture. Based on this information an information technology assessment findings and alternatives document is updated with various recommendations.

To provide the capabilities described in the preceding paragraphs, a number of use cases are implemented in the application performance prediction tool. Table 1 provides a use case summary for one embodiment of an application performance prediction tool. Detailed descriptions of these use cases are given in the paragraphs following Table 1.

TABLE 1

Use Case Diagram

Use Case Name

Add/ Modify/ Delete Company Profile
Add/ Modify/ Delete Network Location
Add/ Modify/ Delete Network Conditions
Add/ Modify/ Delete Model
Add/ Modify/ Delete Network Systems
Add/ Modify/ Delete System
Run Model Variable Analysis
Run Application Performance Report
Print Results
Add/ Modify/ Delete User
Add/ Modify/ Delete Group For an add/modify/delete company profile use case, an administrator or modeler enters metadata about the company. When the company is not currently entered into the system, the user selects to "Add Company" and enters the CCID and company name. The user can then add comments into the appropriate section and submits the company profile. The application performance prediction system saves the information as a new company profile and the information is displayed to the user. To modify a company profile, the user accesses a main page to select the company they wish to modify. The current company profile information is displayed in editable fields and the user updates or changes appropriate information. The modifications are saved and the application performance prediction system updates the information. To delete a company profile, he user selects an 'x' icon next to the company they would like to delete. The application performance prediction system displays the pre-existing information in the working area of the screen and prompts the user to confirm the deletion. The user confirms that they want to delete that particular company, and the company and all associated models are deleted from the application performance prediction system.

In the embodiment, company name and CCID are mandatory fields, so if these are not entered into the system an error message will be displayed and the system will send an error message and not save the data until this field is completed. If the entered CCID matches that of an already-existing CCID, the form is redisplayed with the text boxes populated with the information previously entered. An error message indicates that the CCID has already been entered, the information will not be saved and a new value must be provided For an add/modify/delete network location use case, an administrator or modeler user will, for example, add the location to the network model diagram. More specifically, the application performance prediction system will display location objects on a diagram work space, and the user will drag and drop a network architecture location displayed on a screen onto the working area. When the user drops a location onto the working area the application performance prediction system prompts the user for the location name in a text box and the user enters the name of the location and clicks the minimize icon in the pop-up box. To modify a network location, the user double clicks on the name of the location, the system displays the text box with the location name in it, and the user updates the name of the location and clicks the minimize icon in the pop-up box. To delete a network location, the user double clicks the name of the location, the application performance prediction system displays the name of the network location in the pop up box with the button displayed to delete location, the user selects the delete icon in the pop up box, and the application performance prediction system deletes the location along with all systems and connections associated with the network location.

For an add/modify/delete network connection use case, an administrator or modeler user con operate the application performance prediction system to add a connection and conditions onto the workspace connecting two locations. The network connections include a bandwidth, an average latency, an average packet loss, and an average utilization. As a condition to this use case, at least two network locations exist for the specific company that is going to be modeled and the user has already selected the company's network model diagram. To add the network connection, the user selects a connection within the architecture screen, and drags the connection onto the screen. In one embodiment, the user can "snap" the two ends of the connection onto two locations. When the connection has snapped between two locations, a screen with the vacant text boxes for average latency, packet loss, bandwidth and utilization for a specific connection are displayed, and the he user enters the conditions into the appropriate fields. The user then operates the application performance prediction system to save the network connection conditions to the system. To modify a network connection, the user selects the connection via a user interface, a pop-up box is displayed with the previously entered connection conditions, the user enters the appropriate changes to the connection conditions, and saves the new conditions to the application performance prediction system. To delete a network connection, the user selects the connection, the previously entered connection conditions are displayed, and selects a delete icon to delete the connection. The application performance prediction system asks for confirmation and the user will confirm. The application performance prediction system also deletes the connection and all network conditions associated with the connection.

For an add/modify/delete model use case an administrator or modeler user is able to create a model in the application performance prediction system either through making a new model or by copying an old model to get the network architecture and network conditions already entered into the system. To utilize this use case, a company profile exists in the application performance prediction system along with a company's network architecture. In one embodiment, from a main page of the company profile, the user selects the name of the company, and a model section associated with the selected company is selected. When the user selects to add a model, the application performance prediction system displays a model form including the model name, create from existing model field, and a comments field. Once the user enters model information, a save function is selected and the system saves the information to the system and adds the model and information to the data grid.

For an add/modify/delete network systems use case an administrator or modeler user can add systems (computer applications) to the locations in a work space. The user will also add the amount of users and the path the system takes to its destination. System locations and connections have already been placed on the network model diagram, and the user select the system (computer application) they want to add to a location, dragging and dropping the system onto the location where it is to be run, and prompting the user for the amount of users that use the system (computer application) at the particular location. The application performance prediction system saves the entered data and displays a line illustrating the path of the system. To modify or delete a network system (computer application) from a location, the user selects the location, and information relating to the location is illustrated in a data grid. The application performance prediction is operable such that a user can change the number of users, change the path of the connection or delete the system (computer application) from the data grid. Selection of a 'delete' icon will delete the system (computer application) from the location as well as the line connecting the locations.

Only an administrator can utilize an add/modify/delete system use case in order to populate the systems that will be listed in the drop down menu for the users to select. In one embodiment, the administrator user selects a systems tab, and selects an 'add system' icon. The user inputs the system name and selects 'submit'. If a system is already in the application and needs to be edited the user selects the name of the system and then makes necessary changes to the name. If the user wants to delete the system they choose a delete function and then confirm that the system is to be deleted.

A run model variable analysis use case is available to viewer, administrator, and modeler users and is operable for illustrating how changing one variable on a single network connection will affect performance. The user selects the variable to change, and enters a minimum and maximum range through which the variable is to be tested. In one embodiment, results are illustrated with the response time in between the minimum and maximum that is indicated for the specific variable. When the user runs this test, an output is provided that illustrates that when the variable is changed, the response time changes. For this use case, a network architecture and conditions have already been entered into the model.

In one particular scenario, the user selects the airline and model for which the analysis is to be run. The application performance prediction system displays the model and the user selects a location in the model where the analysis is to be run. When the analysis is completed, the application performance prediction system displays the four variables (PL, L, BW, and U) that are being measured. When the user selects one of these four variables, the application performance prediction system displays minimum, maximum, and increment fields into which the user enters values. After this variable analysis is completed, the application performance prediction system displays a matrix of variable values, for each application at that location, and a response time (ranging from the minimum to the maximum, in each increment). With this use case a user is able to see how a computer application would perform when changes to the network conditions are made.

A run application performance report use case is available to viewer, administrator, and modeler users and is operable for illustrating all of the locations, network conditions and selected applications and indicating a measure of performance. To use this use case, a model for a company, for example an airline, is complete with the network architecture and network conditions. Specifically, the user selects the company model for which they want to run the performance report. The application performance prediction system displays the company model and lists the systems (computer applications) that have already been entered into the application performance prediction system.

The application performance prediction system calculates and displays the current response time performance of the computer applications at each location under the model's architecture and network conditions. With such a use case, the user can see how their current network infrastructure is set up, and the applications performance during this time. One exception is if there are missing items in the network conditions the test is still completed. If the user only has reader access the test will give a message that not all of the fields were completed. If the user has write access they will be given an error message prior to completing the test. All of the network conditions have not been entered within the model being tested, the application performance prediction system will display an error message.

When compared to existing solutions, the above described embodiments provide a cost avoidance, since custom performance tests do not have to be executed for every system within every company. In addition, a cost avoidance relating to the analyzing and diagnosing of customer performance problems after deployment is achieved. Also, a cost avoidance accrues due to only initiating sales campaigns with customers that have network architectures that can realistically use the types of systems (computer applications) that an entity is interested in selling.

In addition to cost avoidance, an increased customer satisfaction occurs due to an ability to estimate network and internet connectivity requirements in order to use such computer application products successfully. An ability to balance system performance with the associated network and internet connectivity cost also results. The application performance prediction system contributes to successful planning for airline owner/operators to use such airline related systems (computer applications) and allows a purveyor of aircraft and these airline operations systems to have a successful entry into service of the aircraft and the associated support that goes along with the sale of aircraft.

While the invention has been described in terms of various specific embodiments, those skilled in the art will recognize that the invention can be practiced with modification within the spirit and scope of the claims.

What is claimed is:

1. A method for identifying and evaluating potential computer network configuration problems as related to deployment of one or more computer applications accessed via an associated computer network architecture, said method comprising:

emulating the computer network architecture and a capability associated with network interconnections between computer application points of use and associated with the computer network architecture;

identifying computer applications hosted at each of the computer systems within the computer network architecture;

estimating response times for hosted computer applications for a plurality of network architecture interconnection conditions; and determining, based on the response time estimates, at least one network architecture reconfiguration scenario for improving performance of the network architecture with respect to a specific computer application.

2. A method according to claim 1 wherein emulating the computer network architecture and a capability associated with network interconnections comprises:

specifying unique computer systems within the computer network architecture; and entering a number of users using each unique computer system.

3. A method according to claim 2 wherein estimating response times for hosted computer applications comprises computing an estimated response time of each unique computer system, the estimated response time taking into account other unique computer systems whose traffic is routed through the same network interconnection.

4. A method according to claim 1 wherein estimating response times for hosted computer applications for a plurality of network architecture interconnection conditions comprises determining an effect on response times by changing at least one of bandwidth, packet loss, latency, and line utilization for at least one of the computer systems.

5. A method according to claim 1 wherein estimating response times for hosted computer applications for a plurality of network architecture interconnection conditions comprises running a single computer system through a set of network conditions.

6. A method according to claim 5 wherein running a single computer system through a single set of network condition tests comprises:

defining and testing a computer system over a range of bandwidth, latencies, packet losses and line utilization values; and storing the response time for each test in a database.

7. A method according to claim 1 wherein emulating the computer network architecture comprises operating a user interface to create representations of custom network architectures, specify network conditions for wide area network and internet connections, specify computer systems used at each network location, specify a number of users of the specified computer system at each network location, and specify a routing of system traffic for the network architecture representation.

8. A method according to claim 1 wherein estimating response times for hosted computer applications for a plurality of network architecture interconnection conditions comprises generating a report of expected end-user response times for a variety of computer network architecture configurations.

9. A method for evaluating the response time of a computer application accessed via an associated computer network architecture, said method comprising:

emulating the computer network architecture and a capability associated with network interconnections between computer application points of use and associated with the computer network architecture;

identifying the computer application, wherein the computer application is hosted by at least one computer system within the computer architecture;

testing a response time of the computer application under multiple network configuration permutations;

storing results of each test in a database; and using the stored results to predict end-user response times for the computer application for each network configuration permutation.

10. A method according to claim 9 wherein testing a response time of the computer application under multiple network configuration permutations comprises changing at least one of bandwidth, packet loss, latency, and line utilization for at least one computer system within the computer network architecture.

11. A system for identifying and evaluating potential computer network configuration problems as related to deployment of one or more computer applications accessed via an associated computer network architecture, said system comprising:

a user interface configured to create a representation of the associated computer network architecture; and a processing device configured to:

emulate, based on the representation, the computer network architecture and a capability associated with network interconnections between computer application points of use and associated with the computer network architecture;

identify computer applications hosted at each computer system within the computer network architecture;

estimate response times for hosted computer applications for a plurality of network architecture interconnection conditions; and determine, based on the response time estimates, at least one network architecture reconfiguration scenario for improving performance of the network architecture with respect to a specific computer application.

12. A system according to claim 11 wherein said user interface is further configured to:

specify unique computer systems within the computer network architecture; and enter a number of users using each unique computer system.

13. A system according to claim 12 wherein to estimate response times, said processing device is further configured to compute an estimated response time of each unique computer system, the estimated response time taking into account other unique computer systems whose traffic is routed through the same network interconnection.

14. A system according to claim 11 wherein to estimate response times, said processing device is further configured to determine an effect on response times by changing at least one of bandwidth, packet loss, latency, and line utilization for at least one of the computer systems.

15. A system according to claim 11 wherein to estimate response times, said processing device is further configured to run a single computer system through a set of network conditions.

16. A system according to claim 15 further comprising a database, wherein to run a single computer system through a set of network conditions, said processing device is further configured to:

define and test the computer system over a range of bandwidth, latencies, packet losses and line utilization values; and store the response time for each test in said database.

17. A system according to claim 11 wherein said user interface is further configured to:

specify network conditions for wide area network and internet connections;

specify computer systems used at each network location;

specify a number of users of the specified computer system at each network location; and specify a routing of system traffic for the network architecture representation.

18. A system according to claim 11 wherein to estimate response times, said processing device is further configured to generate a report of expected end-user response times for a variety of computer network architecture configurations.

* * * * *